US009772614B1

(12) United States Patent
Yu

(10) Patent No.: US 9,772,614 B1
(45) Date of Patent: Sep. 26, 2017

(54) SUNRISE/SUNSET POWER SUPPLY TIME CONTROL SYSTEM

(71) Applicant: Chao-Cheng Yu, Taoyuan (TW)

(72) Inventor: Chao-Cheng Yu, Taoyuan (TW)

( * ) Notice: Subject to any disclaimer, the term of this patent is extended or adjusted under 35 U.S.C. 154(b) by 0 days.

(21) Appl. No.: 15/412,624

(22) Filed: Jan. 23, 2017

(51) Int. Cl.
*H02J 13/00* (2006.01)
*G05B 19/042* (2006.01)
*H02M 7/02* (2006.01)
*G04B 19/26* (2006.01)
*G04B 19/22* (2006.01)
*G06F 1/32* (2006.01)

(52) U.S. Cl.
CPC .......... *G05B 19/042* (2013.01); *G04B 19/22* (2013.01); *G04B 19/26* (2013.01); *H02M 7/02* (2013.01); *G05B 2219/23411* (2013.01)

(58) Field of Classification Search
CPC . H02J 13/00; H05B 37/0281; H05B 37/0245; H05B 37/0263; H05B 37/0272; G06F 1/3209; G06F 1/32; Y04S 40/12; Y04S 40/126
See application file for complete search history.

(56) References Cited

U.S. PATENT DOCUMENTS

| | | | | |
|---|---|---|---|---|
| 6,888,472 B2 * | 5/2005 | Yoshimura | ......... | H05B 37/0263 340/12.23 |
| 7,616,153 B2 * | 11/2009 | Honda | ..................... | G01S 19/14 342/357.74 |
| 8,872,390 B2 * | 10/2014 | Buchheim | .............. | G01D 4/006 307/140 |
| 9,131,552 B2 * | 9/2015 | Reed | .................. | H05B 33/0854 |
| 2007/0052300 A1 * | 3/2007 | Chen | ................ | G01R 31/31721 307/140 |
| 2014/0103742 A1 * | 4/2014 | Bello | ........................ | H02J 3/00 307/140 |
| 2015/0342005 A1 * | 11/2015 | Akcasu | .............. | H05B 37/0209 315/307 |
| 2016/0195864 A1 * | 7/2016 | Kim | ....................... | G05B 15/02 709/221 |
| 2017/0188442 A1 * | 6/2017 | King | .................. | H05B 37/0272 |

* cited by examiner

*Primary Examiner* — Gary L Laxton
(74) *Attorney, Agent, or Firm* — WPAT, P.C., Intellectual Property Attorneys; Anthony King

(57) ABSTRACT

A sunrise/sunset power supply time control system comprises an application program and a power supply controller, wherein the application program is installed on an electronic device comprising a near field communication transmission unit, and the power supply controller is electrically connected to a power gird end and at least a load end, in which the application program can acquire the coordinate values and the current time at which the electronic device is presently located and calculate a sunrise/sunset timetable to which the coordinate values correspond, and then transfer the current time and the sunrise/sunset timetable to the power supply controller via the near field communication transmission unit, while subsequently the power supply controller controls the power supply time in accordance with the received current time as well as the sunrise/sunset time recorded in the sunrise/sunset timetable.

11 Claims, 10 Drawing Sheets

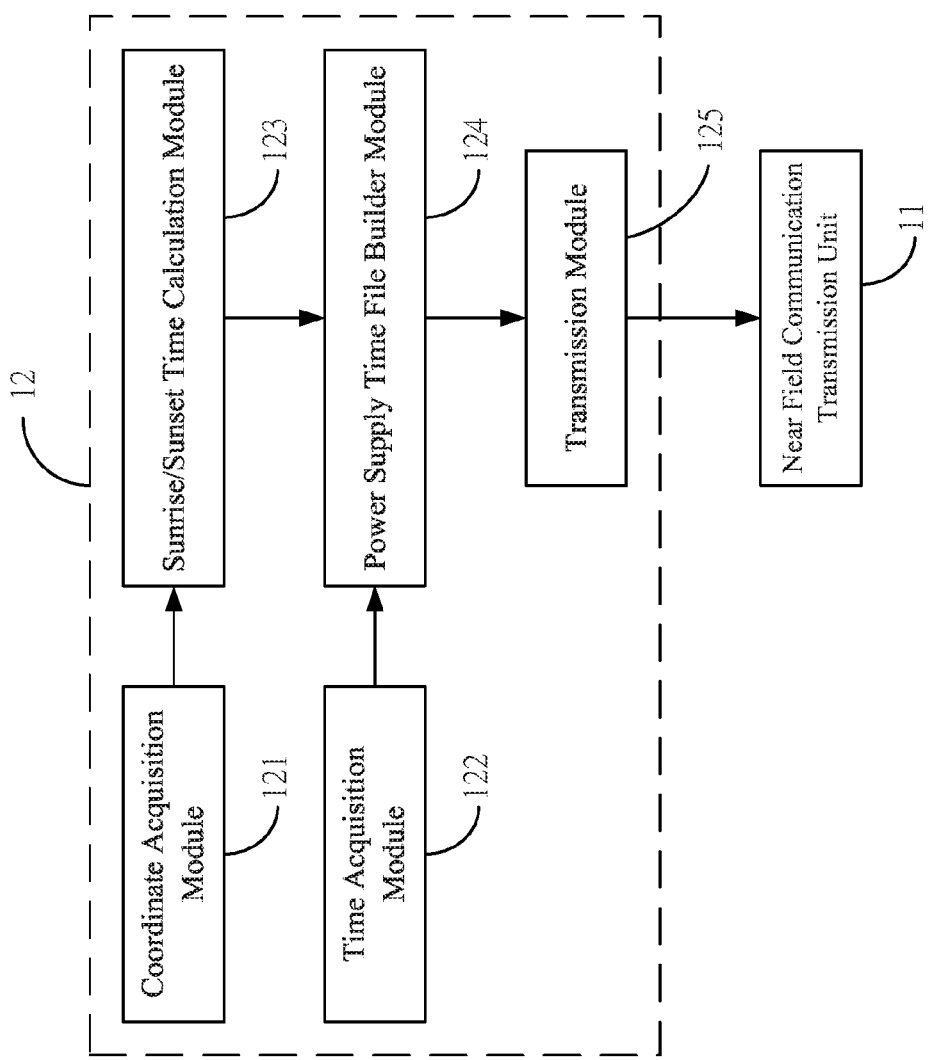

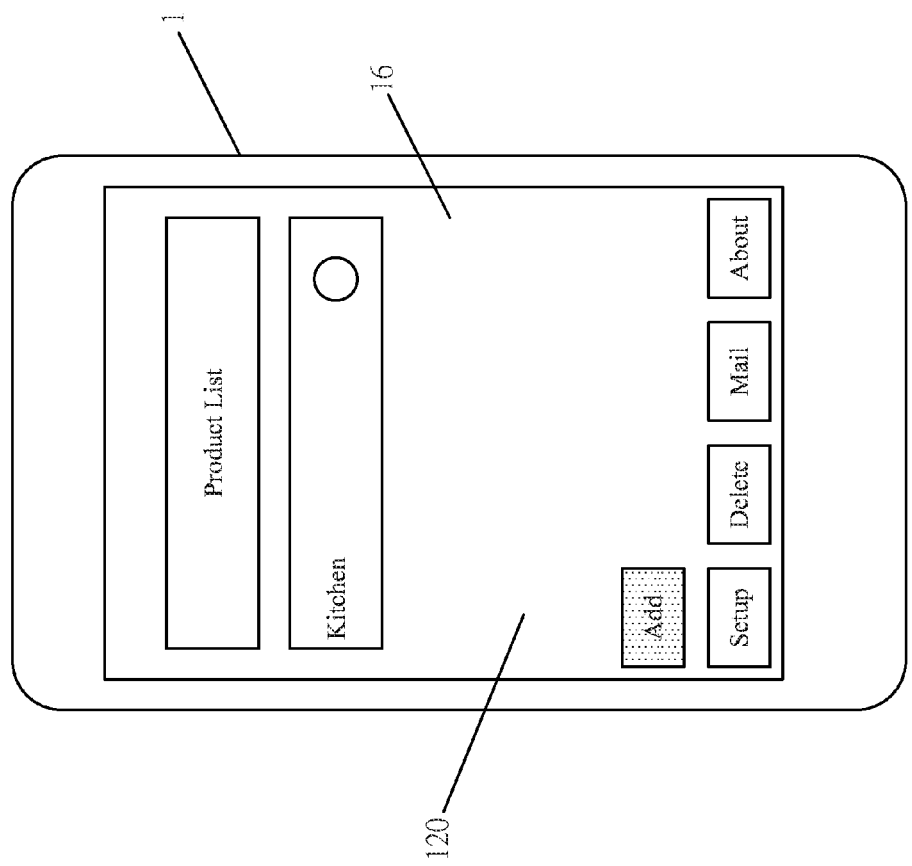

SUNRISE/SUNSET POWER SUPPLY TIME CONTROL SYSTEM

BACKGROUND OF THE INVENTION

1. Field of the Invention

The present invention generally relates to a sunrise/sunset power supply time control system; in particular, it relates to a system allowing a mobile device to build a power supply time file including the current time, coordinate values and corresponding sunrise/sunset time, and then transferring the built power supply time file to a power supply controller by means of the near field communication technologies in order to control the power supply time based on the received current time as well as the sunrise/sunset time in the sunrise/sunset timetable.

2. Description of Related Art

It is well-known that most of the electric power socket devices enabling the timing feature may be equipped with a timer which may be a type of mechanical countdown timer; taking this sort of timer including a wheel disc as an example, a user may need to rotate the wheel disc installed on the timer so as to set up the countdown duration of time to control the power supply time of the electric power socket device thereby saving the power consumption of the electric devices plugged into the electric power socket device.

However, this type of mechanical countdown timers may be simple and direct, the number of wheel disc rotations just represents the extent of the intended power supply time, so it can not be configured to operate for longer power supply time; besides, since the available power supply time that the mechanical countdown timer can be rotated to may be limited, users actually don't have quite much choice for the desired length of power supply time.

Moreover, because the mechanical countdown timers are unable to display the currently remaining power supply time, the user can not precisely appreciate the currently remaining power supply time but simply has to rely on the user's memory to roughly estimate it, thus very likely leading to inefficient power supply on demand. Besides, seeing that power supply conditions in different environments may vary; hence, suppose the power supply processes are manipulated in accordance with time, it is quite possible to encounter annoying issues such as activating power supply too early before sunset or deactivating power supply too late after sunset because of various daylight saving times in different locations, thus the prior art mechanical countdown timers currently available in the market still have significant space for improvements.

Also, in addition to the aforementioned mechanical countdown timers, again, due to different areas and various daylight saving times, such activating-power-supply-before-sunset or deactivating-power-supply-after-sunset problems may similarly occur for currently available electronic timers.

Further, conventional mechanical or electronic timers need multiple timing components and liquid crystal display, which may undesirably cause significant increments on the manufacture costs of the timers and thus fail to meet the demand on economic efficiency.

Hence, it would be an optimal solution if it is possible to develop a type of sunrise/sunset power supply time control system allowing a mobile device to build a power supply time file including the current time, coordinate values and corresponding sunrise/sunset time, and then transferring the built power supply time file to a power supply controller by means of the near field communication technologies in order to control the power supply time based on the received current time as well as the sunrise/sunset time in the sunrise/sunset timetable.

SUMMARY OF THE INVENTION

A sunrise/sunset power supply time control system, comprising: an electronic device, configured to comprise an application program and a near field communication transmission unit, in which the application program includes a coordinate acquisition module, capable of acquiring the coordinate values indicating the location of the electronic device; a time acquisition module, capable of acquiring the current time of the electronic device; a sunrise/sunset calculation module, connected to the coordinate acquisition module and capable of, based on the coordinate values detected by the coordinate acquisition module, calculating the sunrise/sunset timetable that the coordinate values correspond to, in which the sunrise/sunset timetable includes the detected coordinate values and a sunrise/sunset time corresponding to the coordinate values; a power supply time file builder module, connected to the time acquisition module and the sunrise/sunset time calculation module thereby building a power supply time file in accordance with the current time and the sunrise/sunset timetable; a transmission module, connected to the power supply time file builder module thereby transmitting the power supply time file via the near field communication transmission unit; a power supply controller, electrically connected to a power grid end and at least a load end, in which the power supply controller includes an alternative current (AC) power source input module, used to input AC power; a direct current (DC) power source supply module, which is electrically connected to the AC power source input module and used to convert the AC power into the DC power; an AC power source output module, which is electrically connected to a load end in order to output the AC power to the load end; a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end; a central control module, electrically connected to the DC power source supply module in order to control the integral operation mechanism of the power supply controller; a near field communication reception module, electrically connected to the central control module so as to receive the power supply time file transmitted by the near field communication transmission unit of the electronic device; and a sunrise/sunset power supply time control module, electrically connected to the central control module and the near field communication reception module thereby controlling the power supply time based on the current time as well as the sunrise/sunset timetable recorded in the power supply time file.

In a preferred embodiment, it is possible to set up the sunrise time to activate electric power supply and the sunset time to deactivate electric power supply.

In a preferred embodiment, the DC power source supply module further includes: a resistance-capacitance buck circuit, which is used to limit the maximum operation current by means of the capacitive resistance generated by the capacitor under a certain AC signal frequency; a bridge rectifier circuit, which is electrically connected to the resistance-capacitance buck circuit through a first current-limiting circuit so as to rectify the AC power inputted by the AC power source input module into a pulsed DC power; a second current-limiting resistor, which is connected between the AC power source input module and the bridge rectifier circuit; a first filter circuit, which is electrically connected to the bridge rectifier circuit in order to convert the rectified pulsed DC power inputted by the bridge rectifier circuit into the stable DC power; a 24V voltage-stabilizing circuit, which is electrically connected to the first filter circuit through a third current-limiting circuit so as to voltage stabilize the DC power inputted by the first filter circuit to a voltage of 24V thereby supplying electric power to the relay for operations; a 5V voltage-stabilizing circuit, which is electrically connected to the 24V voltage-stabilizing circuit via a fourth current-limiting circuit thereby voltage stabilizing the DC power inputted by the 24V voltage-stabilizing circuit to the voltage of 5V; a second filter circuit, which is electrically connected to the 5V voltage-stabilizing circuit in order to voltage stabilize the DC power outputted by the 5V voltage-stabilizing circuit thereby supplying the stabilized DC power to the central control module for operations; and an operation frequency sampling circuit, which is connected between the resistance-capacitance buck circuit and the central control module and capable of taking the AC signals from the city electric power end to act as the operation counts for the central control module.

In a preferred embodiment, the power supply controller further includes a reset circuit electrically connected to the central control module, in which the reset circuit is, upon repowering, used to provide the central control module with the reset signal.

In a preferred embodiment, the current time of the electronic device that the time acquisition module acquires may include years, months and days.

In a preferred embodiment, the current time of the electronic device that the time acquisition module acquires may further include hours, minutes and second.

In a preferred embodiment, the power supply controller further includes a relay driver circuit electrically connected to the central control module and the relay, in which the relay driver circuit is used to drive the connection to the relay.

In a preferred embodiment, the electronic device comprises a mobile network unit, and the coordinate acquisition module and the time acquisition module can connect to the Internet via the mobile network unit thereby acquiring the coordinate values and the current time at which the electronic device is presently located.

In a preferred embodiment, the electronic device comprises a wireless network unit, and the coordinate acquisition module and the time acquisition module can connect to the Internet via the wireless network unit thereby acquiring the coordinate values and the current time at which the electronic device is presently located.

In a preferred embodiment, the electronic device comprises a Global Positioning System (GPS), and the coordinate acquisition module and the time acquisition module can acquire the coordinate values at which the electronic device is presently located by means of the GPS.

In a preferred embodiment, the electronic device may be a smartphone or a tablet computer.

BRIEF DESCRIPTION OF THE DRAWINGS

FIG. 1B shows a structure view of the application program in the sunrise/sunset power supply time control system according to the present invention.

FIG. 4A shows a product addition implementation view of the sunrise/sunset power supply time control system according to the present invention.

DETAILED DESCRIPTION OF THE PREFERRED EMBODIMENTS

Figure 1A:
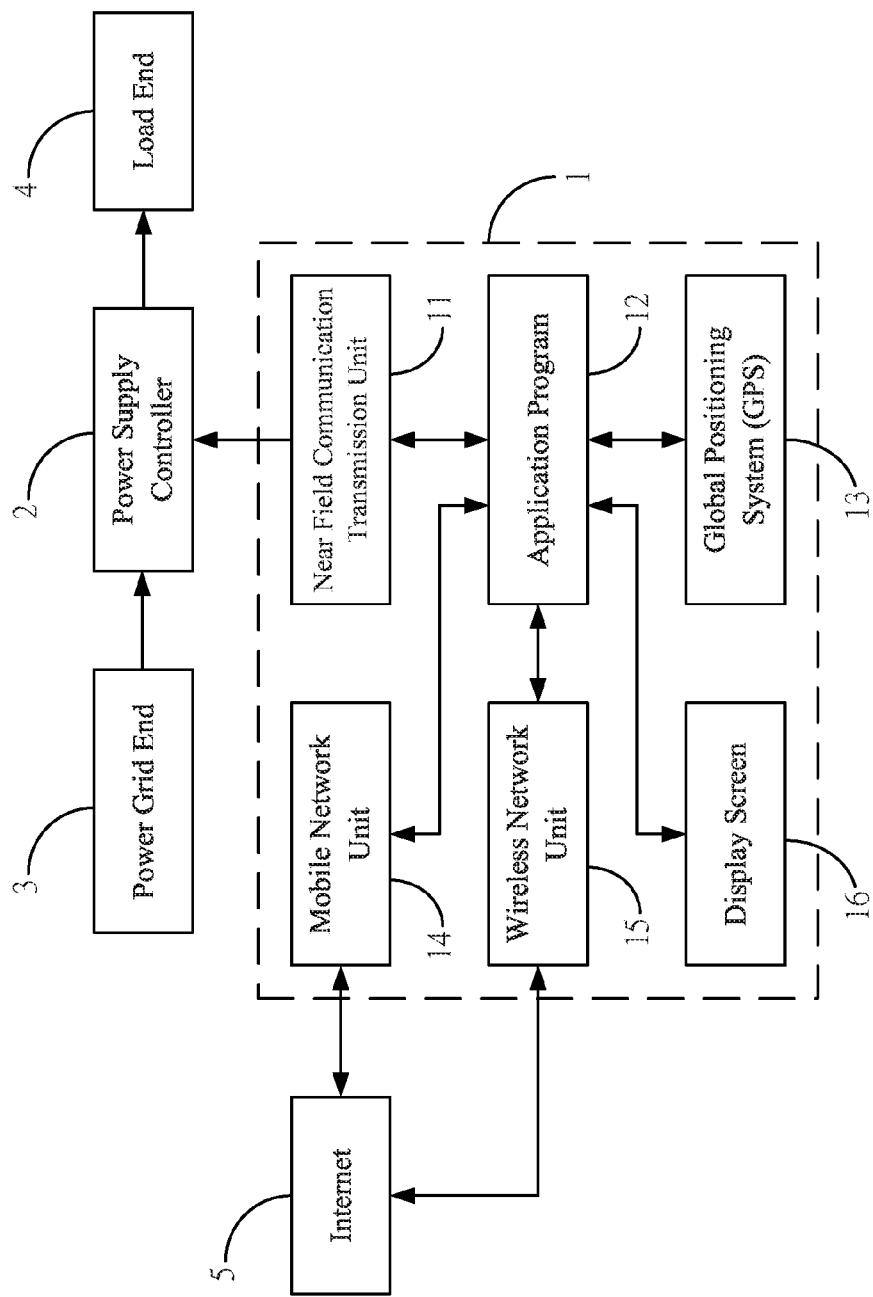
FIG. 1A shows an integral structure view of the sunrise/sunset power supply time control system according to the present invention.
Figure 1C:
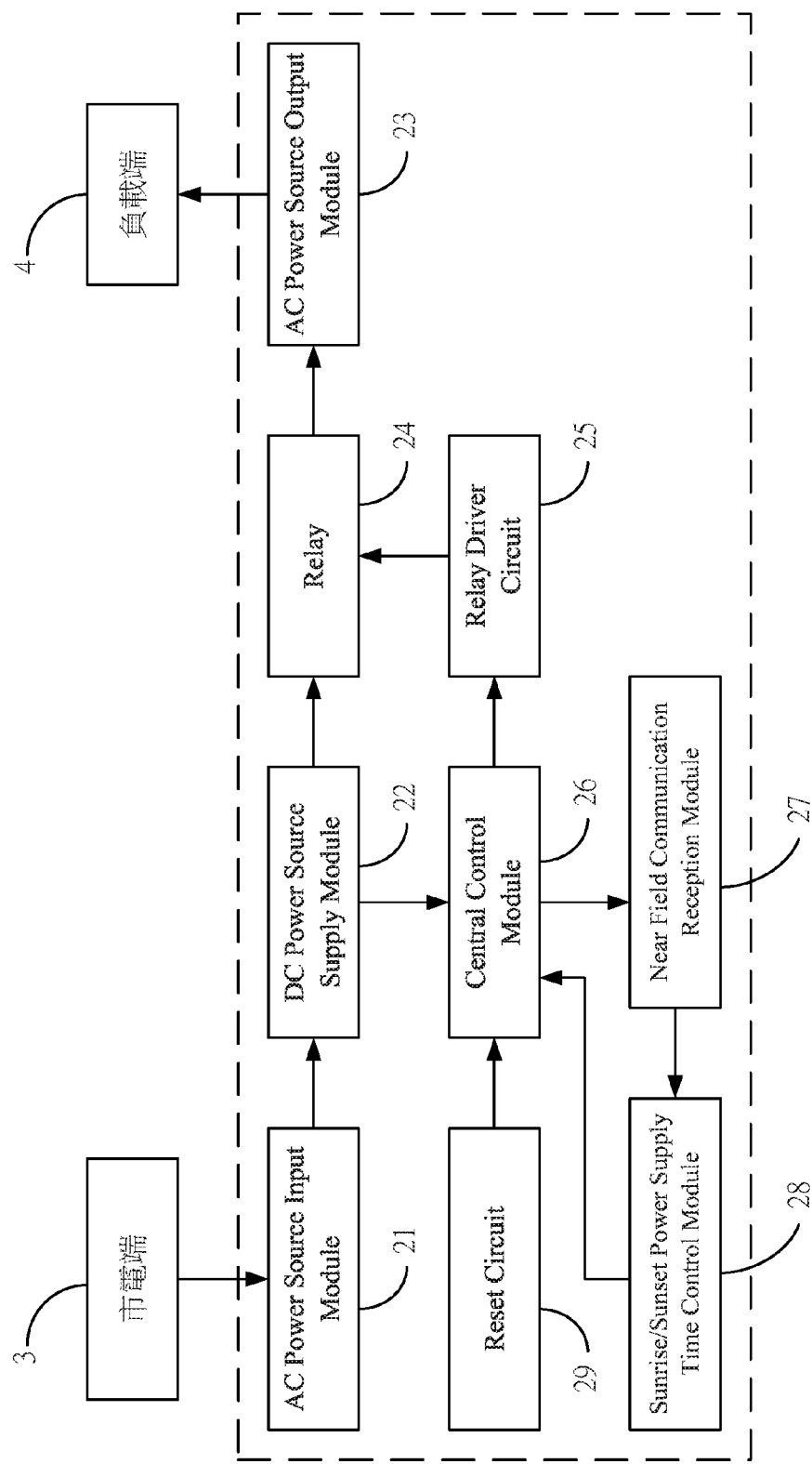
FIG. 1C shows a structure view of the power supply controller in the sunrise/sunset power supply time control system according to the present invention.
Figure 1D:
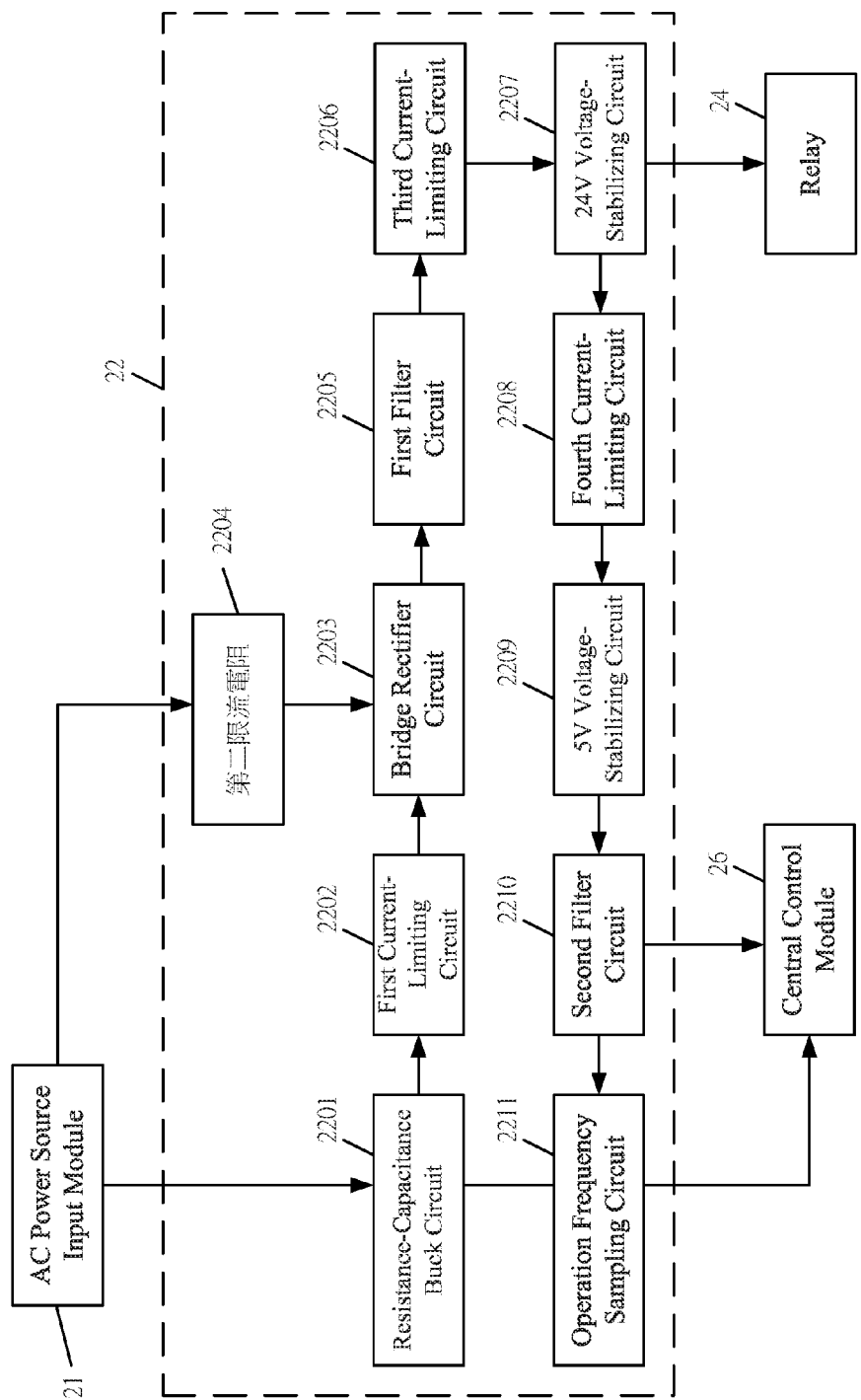
FIG. 1D shows a structure view of the DC power source supply module in the sunrise/sunset power supply time control system according to the present invention.

Other technical contents, aspects and effects in relation to the present invention can be clearly appreciated through the detailed descriptions concerning the preferred embodiments of the present invention in conjunction with the appended drawings.

Refer first to FIGS. 1A-1D, wherein an integral structure view of the sunrise/sunset power supply time control system, a structure view of the application program, a structure view of the power supply controller and a structure view of the direct current (DC) power source supply module according to the present invention are respectively shown. It can be seen from the Figures that the sunrise/sunset power supply time control system according to the present invention comprises an application program 12 and a power supply controller 2, wherein the application program 12 is installed in an electronic device 1 comprising a near field communication transmission unit 11, a Global Positioning System (GPS) 13, a mobile network unit 14, a wireless network unit 15 and a display screen 16, and the power supply controller 2 is electrically connected to a power grid end 3 and at least a load end 4, in which the load end 4 may be a lamp or a power socket.

Herein the application program 12 includes a coordinate acquisition module 121, a time acquisition module 122, a sunrise/sunset calculation module 123, a power supply time file builder module 124 and a transmission module 125, in which the coordinate acquisition module 121 can connect to the Internet 5 by way of the GPS 13 or else through the mobile network unit 14 or wireless network unit 15 so as to acquire the coordinate values of the electronic device 1. Meanwhile, the time acquisition module 122 can connect to the Internet 5 through the mobile network unit 14 or wireless network unit 15 thereby obtaining the current time of the electronic device 1.

In addition, the sunrise/sunset time calculation module 123 can first receive the coordinate values acquired by the coordinate acquisition module 121, and then figure out the sunrise/sunset timetable to which the acquired coordinate values correspond based on such coordinate values; the calculated sunrise/sunset timetable may include the coordinate values as well as the sunrise/sunset time corresponding thereto, as exemplarily shown hereunder:

| State | City | Latitude | Longitude | Current Time | Sunrise Time | Sunset Time |
|---|---|---|---|---|---|---|
| Puerto Rico (PR) | San Juan | 18.422263 | −66.0513 | 2016 Dec. 5 | AM 06:44 | PM 05:44 |
| Massachusetts (MA) | Boston | 42.338947 | −70.91964 | 2016 Dec. 5 | AM 06:58 | PM 04:09 |
| New York (NY) | New York | 40.714754 | −74.00721 | 2016 Dec. 5 | AM 07:05 | PM 04:27 |
| Pennsylvania (PA) | California | 40.063977 | −79.89261 | 2016 Dec. 5 | AM 07:27 | PM 04:52 |

Herein the power supply time file builder module 124 is connected to the time acquisition module 122 and the sunrise/sunset time calculation module 123 thereby building a power supply time file in accordance with the current time and the sunrise/sunset timetable. Also, the transmission module 125 is connected to the power supply time file builder module 124 thereby transferring the power supply time file by way of the near field communication transmission unit 11.

It can be seen that the power supply controller 2 is electrically connected between a power grid end 2 and a load end 3, in which the power supply controller 2 includes a case and a electric circuit board, and the electric circuit board is installed within the case and includes an AC power source input module 21, a DC power source supply module 23, an AC power source output module 23, a relay 24, a relay driver circuit 25, a central control module 26, near field communication reception module 27, a sunrise/sunset power supply time control module 28 and a reset circuit 29.

Herein the AC power source input module 21 can operate to input AC electric power, and the DC power source supply module 22 is electrically connected to the AC power source input module 1101 and operates to convert AC power into DC power. The DC power source supply module 112 includes a resistance-capacitance buck circuit 2201, a first current-limiting circuit 2202, a bridge rectifier circuit 2203, a second current-limiting resistor 2204, a first filter circuit 2205, a third current-limiting circuit 2206, a 24V voltage-stabilizing circuit 2207, a fourth current-limiting circuit 2208, a 5V voltage-stabilizing circuit 2209, a second filter circuit 2210 and an operation frequency sampling circuit 2211.

Herein the resistance-capacitance buck circuit 2201 is applied to limit the maximal operation current by means of the capacitive reactance generated by the capacitor under a fixed AC signal frequency, and the bridge rectifier circuit 2203 can be electrically connected to the resistance-capacitance buck circuit 2202 via the first current-limiting circuit 2201 thereby rectifying the AC power source coming from the AC power source input module 21 into the pulsed DC power source. Moreover, the second current-limiting resistor 2204 can be further installed between the AC power source input module and the bridge rectifier circuit.

The rectified pulsed DC power inputted by the bridge rectifier circuit can be transformed into stable DC power by means of the first filter circuit 2205. Next, with the 24V voltage-stabilizing circuit 2207 electrically connected to the first filter circuit 2205 by way of the third current-limiting circuit 2206, it is possible to voltage stabilize the DC power inputted by the first filter circuit 2205 to a voltage of 24V thereby supplying electric power to the relay 24 for operations.

Subsequently, with the 5V voltage-stabilizing circuit 2209 electrically connected to the 24V voltage-stabilizing circuit via the fourth current-limiting circuit 2208, it is possible to voltage stabilize the DC power inputted by the 24V voltage-stabilizing circuit 2207 to the voltage of 5V. Then, through the second filter circuit 2210, it is possible to stabilize the DC power outputted by the 5V voltage-stabilizing output circuit 110209 so as to provide stable DC power to the central control module 26 for operations. In addition, the operation frequency sampling circuit 2211 is connected between the resistance-capacitance buck circuit 11201 and the central control module 26 and capable of taking the AC signals from the city electric power end 2 to act as the operation counts for the central control module 115.

Besides, the AC power source output module 23 is electrically connected to the load end 3 in order to output the AC power to the load end 3. In addition, the relay 24 is electrically connected to the AC power source input module 21, the DC power source supply module 22 and the AC power source output module 23, wherein the relay 24 is used to control whether the AC power inputted by the AC power source input module 1103 should pass through the relay 24 to supply the power to the AC power source output module 23 such that the AC power source output module 23 can output the AC power to the load end 3.

Also, the near field communication reception module 27 can receive the power supply time file transferred by the near field communication transmission unit 11 of the electronic device 1, in which the power supply time file includes the current time and the sunrise/sunset timetable, such that the sunrise/sunset power supply time control module 28 can control the power supply time in accordance with the current time and the sunrise/sunset timetable recorded in the power supply time file. Upon sunrise, it is possible to transmit an activation signal to the central control module 26 to enable the central control module 26 to control the output of AC power to the load end 3; on the contrary, upon sunset, it is possible to transfer a deactivation signal to the central control module 26 so that the central control module 26 controls and stops outputting AC power to the load end 3.

In addition, the reset circuit 29 is used to provide the reset signal upon repowering the central control module 26.

Figure 2:
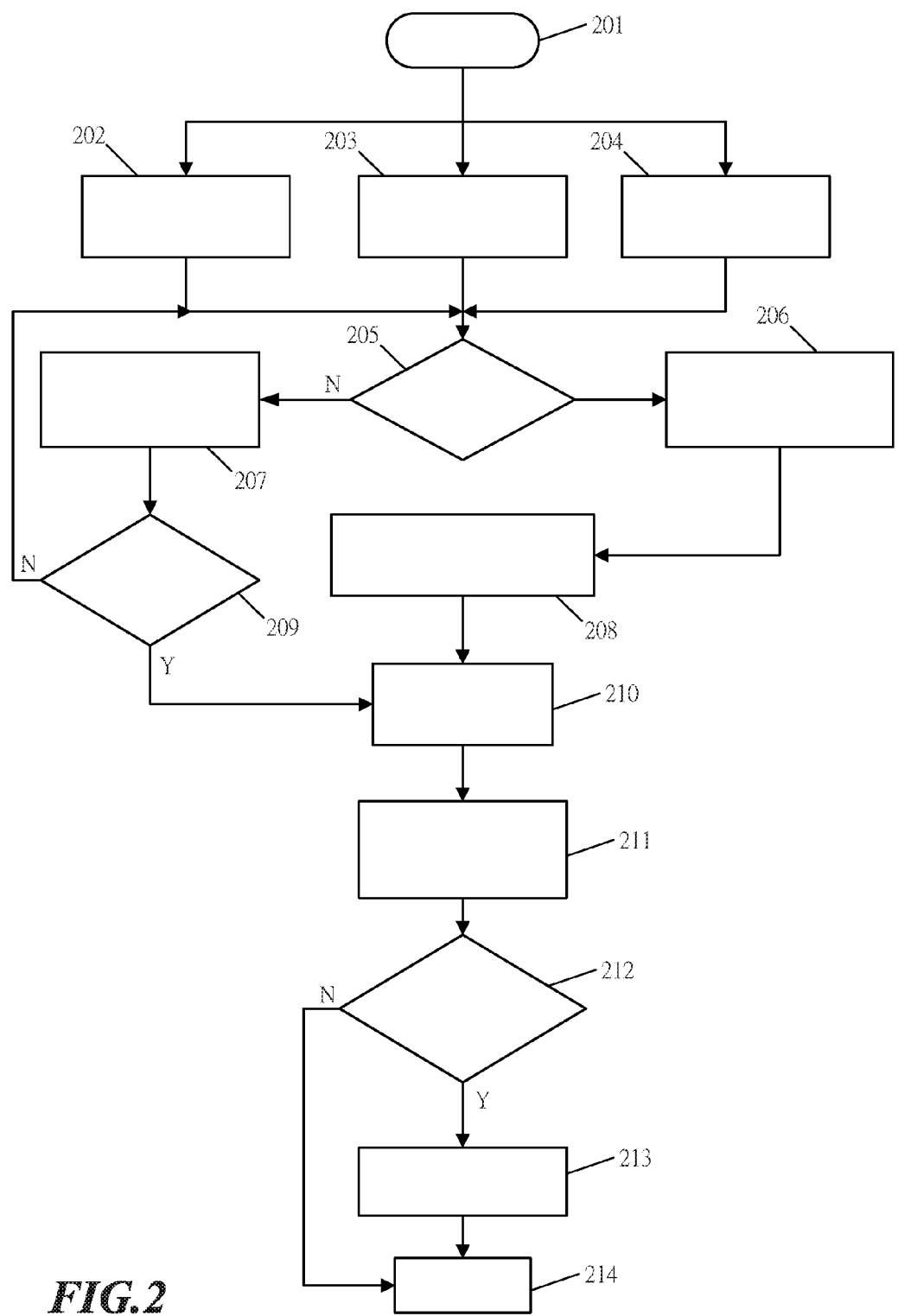
FIG. 2 shows a setup flowchart of the sunrise/sunset power supply time control system according to the present invention.

Furthermore, a setup flowchart is shown in FIG. 2, illustrated as below:

(1) Initially, starting the application program (APP) and adding a product 201, verifying whether the WIFI, 3G/4G or GPS functions of the electronic device have been activated 202, 203, 204, and then determining whether one of such three functions is now operating 205;

(2) if yes, using such WIFI, 3G/4G, GPS functions to read the coordinate values of the electronic device 206, and afterwards, calculating the sunrise/sunset timetable for that location by means of the obtained coordinate values 208;

(3) if no, displaying a messages such as "Please turn on WIFI, 3G/4G or GPS to execute the sunrise/sunset function" etc. 207, and then verifying whether it is correct or not 209; if incorrect, returning to STEP 203, 203, 204 to check again;

(4) subsequently, in case the STEP 208 or STEP 209 being verified as correct, reading the current time of the electronic device 210;

(5) transferring the power supply time file to the power supply controller by using the near field communication technologies 211, and then determining whether the sunrise/sunset timetable has been built 212; if yes, transferring the sunrise/sunset timetable to the power supply controller 213, and completing the setup process 214; contrarily, if not, directly going to STEP 214 and completing the setup process.

Figure 3:
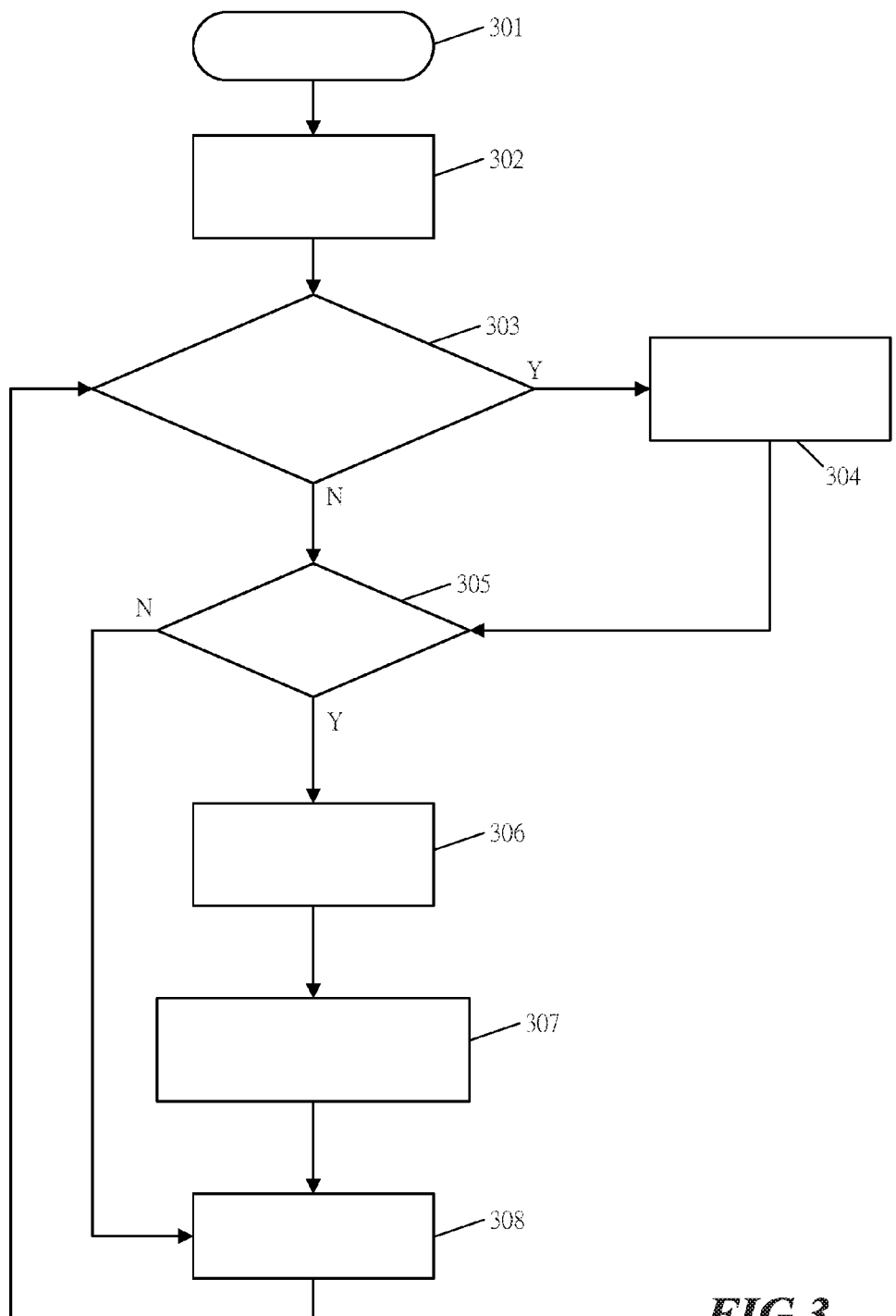
FIG. 3 shows an execution flowchart of the sunrise/sunset power supply time control system according to the present invention.

In addition, an execution flowchart is shown in FIG. 3, illustrated as below:

(1) Initially activating the power supply controller 301, then reading the output ON/OFF time setup parameters (sunrise/sunset power supply parameters) recorded in the power supply time file 302;

(2) next, determining whether the current time is equal to the setup time 303; that is, determining whether to activate sunrise power supply or deactivate sunset power supply; if yes, executing the output ON/OFF operation based on the setup 304; or else, if no, determining whether the near field communication is started 305;

(3) subsequently, if determined to be "started", then reading the values transmitted by the near field communication (the power supply time file) 306, and, afterwards, saving the setup parameters recorded in the power supply time file into the required area of the power supply controller in accordance with the setup function 307 and continuing the accumulation operation based on the current time 308;

(4) contrarily, if determined to be "not started", then jumping to STEP 308, and re-entering STEP 303 from STEP 308 to repeat the determination operation.

Figure 4B:
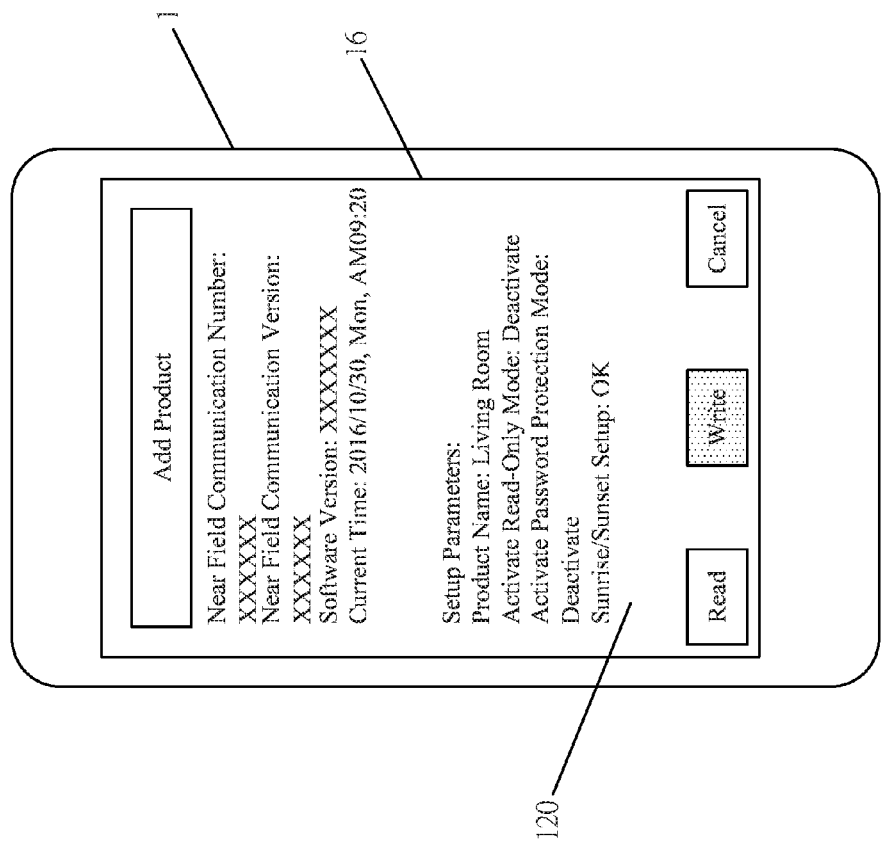
FIG. 4B shows a product addition implementation view of the sunrise/sunset power supply time control system according to the present invention.
Figure 5A:
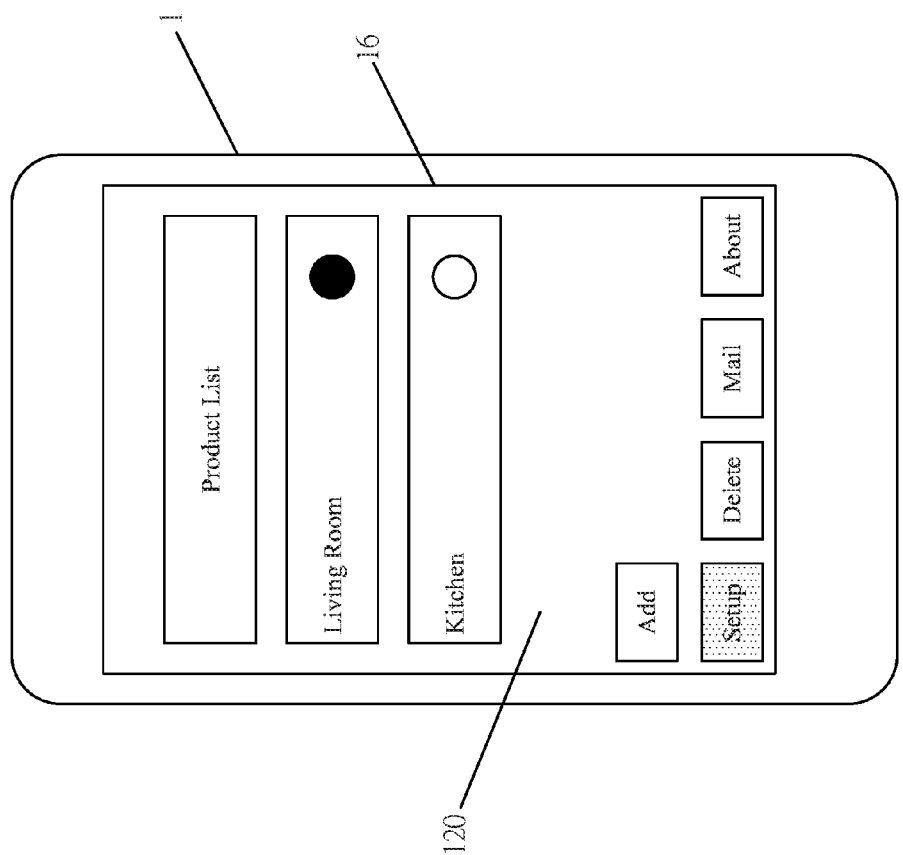
FIG. 5A shows a power supply implementation view of the sunrise/sunset power supply time control system according to the present invention.
Figure 5B:
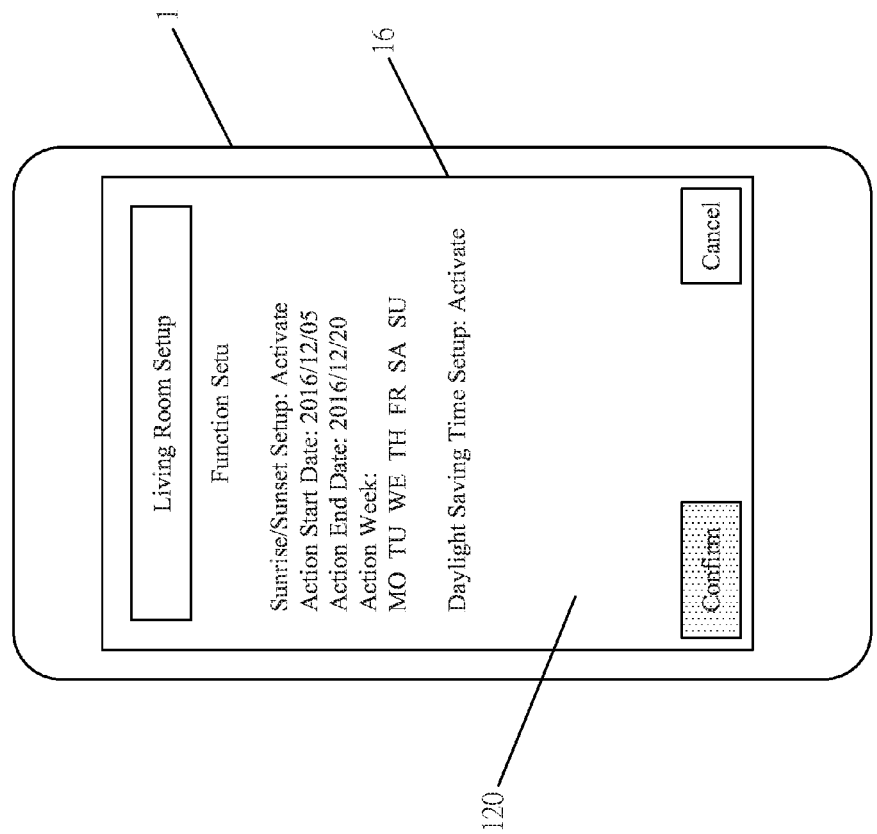
FIG. 5B shows a power supply implementation view of the sunrise/sunset power supply time control system according to the present invention.

Upon adding a product (i.e., the load end 3), as shown in FIG. 4A, it requires to first select "Add" to acquire and input relevant data, and then, as shown in FIG. 4B, tapping the "Write" box so as to complete the addition procedure; FIG. 5A shows the completion of this adding operation, so that it is then possible to select "Living Room" for setup, and next, press down the "Setup" to configure according to the day and week controlled by the sunrise/sunset timetable; after completion, as shown in FIG. 5B, press down "Confirm" to terminate the setup process.

In comparison with other conventional technologies, the sunrise/sunset power supply time control system according to the present invention provides the following advantages:

(1) The present invention is able to prevent undesirable situations such as activating the power supply before sunset or deactivating the power supply after sunset.

(2) The present invention allows a mobile device to build a power supply time file including the current time, coordinate values and corresponding sunrise/sunset time, and then transferring the built power supply time file to a power supply controller by means of the near field communication technologies in order to control the power supply time based on the received current time as well as the sunrise/sunset time listed in the sunrise/sunset timetable.

(3) The present invention can be effectively applied on mechanical or electronic timers without using any timing buttons and liquid crystal displays, thus greatly reducing required manufacture costs and facilitating the optimal economic efficiency.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A sunrise/sunset power supply time control system, comprising:
  an electronic device, configured to comprise an application program and a near field communication transmission unit, in which the application program includes:
    a coordinate acquisition module, capable of acquiring the coordinate values indicating the location of the electronic device;
    a time acquisition module, capable of acquiring the current time of the electronic device;
    a sunrise/sunset calculation module, connected to the coordinate acquisition module and capable of, based on the coordinate values detected by the coordinate acquisition module, calculating the sunrise/sunset timetable that the coordinate values correspond to, in which the sunrise/sunset timetable includes the detected coordinate values and a sunrise/sunset time corresponding to the coordinate values;
    a power supply time file builder module, connected to the time acquisition module and the sunrise/sunset time calculation module thereby building a power supply time file in accordance with the current time and the sunrise/sunset timetable;
    a transmission module, connected to the power supply time file builder module thereby transmitting the power supply time file via the near field communication transmission unit;
  a power supply controller, electrically connected to a power grid end and at least a load end, in which the power supply controller includes:
    an alternative current (AC) power source input module, used to input AC power;
    a direct current (DC) power source supply module, which is electrically connected to the AC power source input module and used to convert the AC power into the DC power;
    an AC power source output module, which is electrically connected to a load end in order to output the AC power to the load end;
    a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end;
    a central control module, electrically connected to the DC power source supply module in order to control the integral operation mechanism of the power supply controller;
    a near field communication reception module, electrically connected to the central control module so as to receive the power supply time file transmitted by the near field communication transmission unit of the electronic device; and
    a sunrise/sunset power supply time control module, electrically connected to the central control module and the near field communication reception module thereby controlling the power supply time based on the current time as well as the sunrise/sunset timetable recorded in the power supply time file.

2. The sunrise/sunset power supply time control system according to claim 1, wherein it is possible to set up the sunrise time to activate electric power supply and the sunset time to deactivate electric power supply.

3. The sunrise/sunset power supply time control system according to claim 1, wherein the DC power source supply module further includes:
   a resistance-capacitance buck circuit, which is used to limit the maximum operation current by means of the capacitive resistance generated by the capacitor under a certain AC signal frequency;
   a bridge rectifier circuit, which is electrically connected to the resistance-capacitance buck circuit through a first current-limiting circuit so as to rectify the AC power inputted by the AC power source input module into a pulsed DC power;
   a second current-limiting resistor, which is connected between the AC power source input module and the bridge rectifier circuit;
   a first filter circuit, which is electrically connected to the bridge rectifier circuit in order to convert the rectified pulsed DC power inputted by the bridge rectifier circuit into the stable DC power;
   a 24V voltage-stabilizing circuit, which is electrically connected to the first filter circuit through a third current-limiting circuit so as to voltage stabilize the DC power inputted by the first filter circuit to a voltage of 24V thereby supplying electric power to the relay for operations;
   a 5V voltage-stabilizing circuit, which is electrically connected to the 24V voltage-stabilizing circuit via a fourth current-limiting circuit thereby voltage stabilizing the DC power inputted by the 24V voltage-stabilizing circuit to the voltage of 5V;
   a second filter circuit, which is electrically connected to the 5V voltage-stabilizing circuit in order to voltage stabilize the DC power outputted by the 5V voltage-stabilizing circuit thereby supplying the stabilized DC power to the central control module for operations; and
   an operation frequency sampling circuit, which is connected between the resistance-capacitance buck circuit and the central control module and capable of taking the AC signals from the city electric power end to act as the operation counts for the central control module.

4. The sunrise/sunset power supply time control system according to claim 1, wherein the power supply controller further includes a reset circuit electrically connected to the central control module, in which the reset circuit is, upon repowering, used to provide the central control module with the reset signal.

5. The sunrise/sunset power supply time control system according to claim 1, wherein the current time of the electronic device that the time acquisition module acquires includes years, months and days.

6. The sunrise/sunset power supply time control system according to claim 5, wherein the current time of the electronic device that the time acquisition module acquires further includes hours, minutes and seconds.

7. The sunrise/sunset power supply time control system according to claim 1, wherein the power supply controller further includes a relay driver circuit electrically connected to the central control module and the relay, in which the relay driver circuit is used to drive the connection to the relay.

8. The sunrise/sunset power supply time control system according to claim 1, wherein the electronic device comprises a mobile network unit, and the coordinate acquisition module and the time acquisition module can connect to the Internet via the mobile network unit thereby acquiring the coordinate values and the current time at which the electronic device is presently located.

9. The sunrise/sunset power supply time control system according to claim 1, wherein the electronic device comprises a wireless network unit, and the coordinate acquisition module and the time acquisition module can connect to the Internet via the wireless network unit thereby acquiring the coordinate values and the current time at which the electronic device is presently located.

10. The sunrise/sunset power supply time control system according to claim 1, wherein the electronic device comprises a Global Positioning System (GPS), and the coordinate acquisition module and the time acquisition module can acquire the coordinate values at which the electronic device is presently located by means of the GPS.

11. The sunrise/sunset power supply time control system according to claim 1, wherein the electronic device is a smartphone or a tablet computer.

* * * * *